US008493611B2

(12) United States Patent
Saito

(10) Patent No.: US 8,493,611 B2
(45) Date of Patent: Jul. 23, 2013

(54) PRINT JOB CONTROL APPARATUS, PRINT JOB CONTROL METHOD, AND COMPUTER-READABLE STORAGE MEDIUM STORING A PROGRAM THEREOF

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1116 days.

(21) Appl. No.: 12/396,234

(22) Filed: Mar. 2, 2009

(65) Prior Publication Data

US 2009/0219571 A1 Sep. 3, 2009

(30) Foreign Application Priority Data

Mar. 3, 2008 (JP) ................................. 2008-052583

(51) Int. Cl.
*G06K 15/02* (2006.01)
*H04N 1/40* (2006.01)
*H04N 1/393* (2006.01)
*H04N 1/387* (2006.01)
*H04N 1/46* (2006.01)
*G03G 15/00* (2006.01)

(52) U.S. Cl.
USPC ............ 358/1.2; 358/449; 358/451; 358/452; 358/537; 399/86; 399/370; 399/376; 399/389

(58) Field of Classification Search
None
See application file for complete search history.

(56) References Cited

U.S. PATENT DOCUMENTS

| 2005/0213116 A1 | 9/2005 | Uejo |
| 2005/0243370 A1* | 11/2005 | Imai et al. .................... 358/1.18 |
| 2005/0254078 A1 | 11/2005 | Patton et al. |
| 2005/0280859 A1* | 12/2005 | Jeon et al. .................... 358/1.14 |
| 2006/0238793 A1* | 10/2006 | Akashi et al. ................ 358/1.13 |
| 2008/0062438 A1* | 3/2008 | Lin et al. ........................ 358/1.2 |

FOREIGN PATENT DOCUMENTS

| EP | 1 717 690 A2 | 11/2006 |
| EP | 1 717 690 A3 | 9/2011 |
| JP | 2002-029119 A | 1/2002 |
| JP | 2005-260332 A | 9/2005 |
| JP | 2005-266915 A | 9/2005 |
| JP | 2005-324553 A | 11/2005 |
| JP | 2007-257584 A | 10/2007 |
| JP | 2007-265388 A | 10/2007 |

OTHER PUBLICATIONS

European Search Report for EP 09 15 4076 dated Sep. 21, 2012.
Japanese Office Action dated Sep. 3, 2012 in JP 2008-052583.

* cited by examiner

*Primary Examiner* — Thomas Lett
(74) *Attorney, Agent, or Firm* — Carter, DeLuca, Farrell & Schmidt, LLP

(57) ABSTRACT

There is provided a print job control apparatus including an acquiring unit configured to acquire post-processing function information of a digital printing apparatus, a determination unit configured to reference the post-processing function information and the print job, and determine to use either a post-processing function of the digital printing apparatus or a post-processing apparatus for post-processing, a first generating unit configured to generate a print job to be executed using the post-processing function of the digital printing apparatus, a second generating unit configured to generate a print job to be executed using a post-processing apparatus, and a sending unit configured to send the print jobs generated by the first or second generating units to the digital printing apparatus and the post-processing apparatus.

5 Claims, 12 Drawing Sheets

FIG. 5

| TYPE OF FINISHING | ANALYSIS RESULT |
|---|---|
| FOLDING | USE INTERNAL FINISHING FUNCTION |
| TRIMMING | NOT TO BE PROCESSED |
| COLLATING | USE INTERNAL FINISHING FUNCTION |

FIG. 6

| PROCESS OF MERGING INTO JOB TICKET FOR DIGITAL PRINTING | |
|---|---|
| FOLDING | |
| COLLATING | |
| INFORMATION OF NECESSITY OF SENDING JOB TO POST-PROCESSING APPARATUS | |
| CLASSIFICATION OF POST-PROCESSING APPARATUS | SENDING OF JOB |
| FOLDING MACHINE | UNNECESSARY |
| TRIMMING MACHINE | UNNECESSARY |
| COLLATING MACHINE | UNNECESSARY |

PRINT JOB CONTROL APPARATUS, PRINT JOB CONTROL METHOD, AND COMPUTER-READABLE STORAGE MEDIUM STORING A PROGRAM THEREOF

BACKGROUND OF THE INVENTION

1. Field of the Invention

The present invention relates to print job control apparatuses that control print jobs, method and computer-readable storage medium a program thereof.

2. Description of the Related Art

Conventionally, in commercial printing industries, in which orders are received from third parties (customers and clients) to produce printed materials (magazines, newspapers, catalogs, advertisements, photographic prints, and the like) and the printed materials desired by the client are produced, it is common to use large scale printing apparatuses such as offset plate printing presses. With these types of apparatuses, work advances through various processes such as manuscript input, design/layout, comps (presentations based on printer output), proofing (layout corrections and color correction), press proofs (proof printouts), plate making, printing, post-processing tasks, and shipping. This is because making plates is unavoidable when using the above-mentioned printing presses, and once plates are made, making modifications to them is not easy and is considerably disadvantageous in terms of cost, and therefore careful proofing is essential in tasks such as layout checks and color confirmations. As a result, extensive equipment is required in these tasks, and to a certain extent time is also required to produce the printed materials that the client desires. Moreover, specialized knowledge has been required for these respective tasks and the know-how of a person proficient in the tasks has been necessary. However, in recent years, there have been improvements in the quality and performance of digital printing machines used to respond to small quantity and quick turnaround jobs, and these digital printing machines are being widely adopted in the printing industry. As a result, in recent years there have been an increasing number of cases in which users of offset printing presses have been adopting digital printing machines. Consequently, rather than constructing separate workflows for offset printing and digital printing, there is a growing requirement to construct a workflow (hybrid workflow) in which the use of printing machines is divided according to factors such as delivery times, quality, job size, and costs.

In the case where a printing enterprise is adding digital printing equipment to an offset printing based print workflow system to construct a hybrid workflow system, it is necessary to give consideration to differences between offset printing and digital printing such as those indicated hereinafter. In offset printing, multiple pages (for example, eight pages per side) are allotted and printed on a large sheet of paper. Further still, after printing, multiple post-processing processes are separately necessary for finishing. Furthermore, generally a special-purpose post-processing apparatus is used for each of the post-processing processes. Accordingly, a special-purpose job ticket is assigned for the offset printing press and each post-processing apparatus. On the other hand, in digital printing using a multifunctional peripheral (also called an MFP), it is possible to use standard size papers (for example, A4 and A3), which are smaller than the papers in offset printing. And such devices are capable of carrying out printing for each page and sorting pages into single lots, as well as carrying out simple finishing processes (such as half folding, zigzag folding, cutting at specified thicknesses (number of pages) and specified positions, and stapling up to specified thicknesses). Accordingly, knowledge and experience are required of an operator for considering the above-described differences (for determining whether or not to use the MFP's simple finishing processes for example), which undesirably increases the operational burden of the operator. Accordingly, a workflow system is desired that is capable of automatically inputting the print jobs used in conventional offset printing as they are into a digital printing workflow.

Japanese Patent Laid-Open No. 2005-324553 describes a print control device in which print job commands for processing a print job are obtained, and a determination is performed as to whether or not the obtained print job commands and default print job commands stored in a memory are matched. When not matching is determined, the print control device replaces the default print job commands with the obtained print job commands. Furthermore, Japanese Patent Laid-Open No. 2005-260332 describes an image formation support device that performs electronic trimming by calculating from the file sizes layout information such as imposition of TIFF format image file data generated in RIP processing and placement positions of each page. After electronic trimming, this image formation support device aligns the vertical orientation of the pages and changes the arrangement of the pages that have undergone electronic trimming in response to collation instructions or face-down instructions when there are such instructions.

However, the method described in Japanese Patent Laid-Open No. 2005-324553 presumes that all print commands are available in a single print job, and therefore no consideration is given to a point that instructions are necessary for each press, which is an intrinsic feature of offset printing. For this reason, when inputting a print job of an offset printing workflow to a digital printing workflow, it is necessary to reset the print job containing instructions for multiple finishing processes for multiple post-processing apparatuses. Also, in the method described in Japanese Patent Laid-Open No. 2005-260332, in order to input an offset printing job to digital printing, large sized sheet image data that has undergone imposition for plate-making is disassembled electronically and the imposition settings are converted. Consequently, it is necessary to perform the conversion so that the image data is made suitable for digital printing. However, in order to carry out this conversion, consideration must be given to the differences in post-processing processes (finishing processes) during offset printing and digital printing, and an operator cannot easily change these.

SUMMARY OF THE INVENTION

The present invention provides a print job control apparatus that is capable of automatically converting the finishing process instructions of a print job in press plate printing to finishing process instructions of a print job in digital printing.

The present invention in its first aspect provides a print job control apparatus that receives a print job to be used in a press plate printing system having post-processing and generates a print job capable of being used in a digital printing system including a digital printing apparatus and a post-processing apparatus, comprising: an acquiring unit configured to acquire post-processing function information of the digital printing apparatus, a determination unit configured to reference the post-processing function information acquired by the acquiring unit and the received print job, and determine to use either a post-processing function of the digital printing apparatus or the post-processing apparatus for the post-processing, a first generating unit configured to generate a print job by which post-processing, for which the determination unit has determined a post-processing function of the digital printing apparatus to be used, is executed by the post-processing function of the digital printing apparatus, a second generating unit configured to generate a print job by which post-processing, for which the determination unit has determined the post-processing apparatus to be used, is executed by the post-processing apparatus, and a sending unit configured to send the print job generated by the first generating unit to the digital printing apparatus or send the print job generated by the second generating unit to the post-processing apparatus.

The present invention in its second aspect provides a print job control method executed in a print job control apparatus that receives a print job to be used in a press plate printing system having post-processing and generates a print job capable of being used in a digital printing system including a digital printing apparatus and a post-processing apparatus, the print job control method comprising: an acquiring step of acquiring post-processing function information of the digital printing apparatus, a determination step of referencing the post-processing function information acquired in the acquiring step and the received print job, and determining to use either a post-processing function of the digital printing apparatus or the post-processing apparatus for the post-processing, a first generating step of generating a print job by which post-processing, for which the post-processing function of the digital printing apparatus has been determined in the determination step to be used, is executed by the post-processing function of the digital printing apparatus, a second generating step of generating a print job by which post-processing, for which the post-processing apparatus has been determined in the determination step to be used, is executed by the post-processing apparatus, and a sending step of sending the print job generated in the first generating step to the digital printing apparatus or sending the print job generated in the second generating step to the post-processing apparatus.

The present invention in its third aspect provides a computer-readable storage medium on which is stored a print job control program for receiving a print job to be used in a press plate printing system having post-processing and for generating a print job capable of being used in a digital printing system including a digital printing apparatus and a post-processing apparatus, the program causing a computer to function so as to: acquire post-processing function information of the digital printing apparatus, reference the acquired post-processing function information and the print job, and determine to use either a post-processing function of the digital printing apparatus or the post-processing apparatus for the post-processing, generate a print job by which post-processing, for which the post-processing function of the digital printing apparatus has been determined to be used, is executed by the post-processing function of the digital printing apparatus, generate a print job by which post-processing, for which the post-processing apparatus has been determined to be used, is executed by the post-processing apparatus, and send the generated print job to the digital printing apparatus when a post-processing function of the digital printing apparatus is determined to be used or send the generated print job to the post-processing apparatus when the post-processing apparatus is determined to be used.

The present invention in its fourth aspect provides a print job control apparatus that receives a print job for a press plate printing system and generates a print job for a digital printing system including a digital printing apparatus, comprising: an acquiring unit configured to acquire a paper size outputable by the digital printing apparatus, an alteration unit configured to alter arrangement information of page data specified by the print job for the press plate printing system so that page data contained in the print job for the press plate printing system is arranged in the paper size acquired by the acquiring unit, and a generating unit configured to generate the print job for the digital printing system based on the arrangement information altered by the alteration unit.

The present invention in its fifth aspect provides a print job control method executed in a print job control apparatus that receives a print job for a press plate printing system and generates a print job for a digital printing system including a digital printing apparatus, the print job control method comprising an acquiring step of acquiring a paper size outputable by the digital printing apparatus, an alteration step of altering arrangement information of page data specified by the print job for the press plate printing system so that page data contained in the print job for the press plate printing system is arranged in the paper size acquired in the acquiring step, and a generating step of generating the print job for the digital printing system based on the arrangement information altered in the alteration step.

The present invention in its sixth aspect provides a computer-readable storage medium on which is stored a print job control program for receiving a print job for a press plate printing system and for generating a print job for a digital printing system including a digital printing apparatus, the program causing a computer to function so as to: acquire a paper size outputable by the digital printing apparatus, alter arrangement information of page data specified by the print job for the press plate printing system so that page data contained in the print job for the press plate printing system is arranged in the acquired paper size, and generate the print job for the digital printing system based on the altered arrangement information.

With the present invention it is possible to automatically convert the finishing process instructions of a print job in press plate printing to finishing process instructions of a print job in digital printing.

Further features of the present invention will become apparent from the following description of exemplary embodiments with reference to the attached drawings.

BRIEF DESCRIPTION OF THE DRAWINGS

FIG. 5 is a diagram showing one example of a finishing process analysis result.

FIG. 6 is a diagram showing one example of a job ticket conversion instruction list.

DESCRIPTION OF THE EMBODIMENTS

Hereinafter, embodiments for executing the present invention are described in detail while referencing the accompanying drawings. It should be noted that same reference numbers are assigned to same structural elements and description thereof is omitted.

Figure 1:
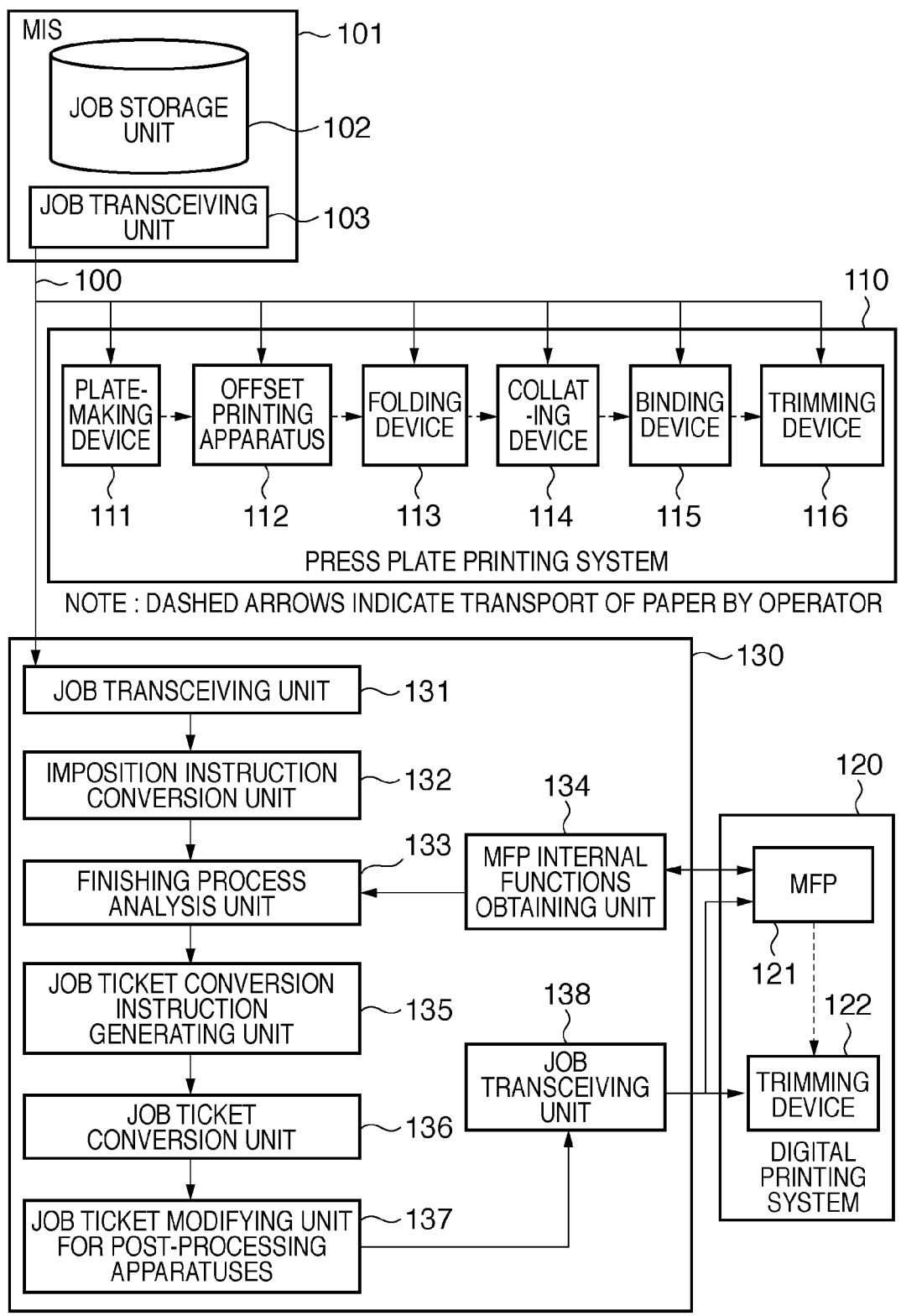
FIG. 1 is a diagram showing one example of a system that is configured including a print job control apparatus, an offset printing workflow system, and a digital printing workflow system.

FIG. 1 is a diagram showing one example of a system that is configured including a print job control apparatus according to a first embodiment of the present invention, a press plate printing system, and a digital printing system. It should be noted that in the following description, the press plate printing system may also be referred to as an offset printing workflow system, and the digital printing system may also be referred to as a digital printing workflow system. Furthermore, a print job to be used in the press plate printing system is defined as a press plate printing system print job and a print job to be used in the digital printing system is defined as a digital printing system print job. As shown in FIG. 1, sending and receiving of data (such as image data, job tickets, control data, status request data, and status data) can be carried out by computers, devices, and printing systems through a network 100. An MIS (management information system) 101 comprehensively manages job processing conditions. For example, the MIS is a computer device (information processing device) having components such as a CPU, a ROM, a RAM, and an HD, and its functionality is achieved by the CPU executing programs stored on the ROM, HD, or other storage media. A job storage unit 102 stores jobs for the printing apparatuses or for various post-processing apparatuses. A job transceiving unit 103 carries out the transceiving of all jobs and statuses handled between the MIS and the printing apparatuses of the offset printing workflow or the various post-processing apparatuses, and the MIS and the print job control apparatus of the digital printing workflow. Here, "job" includes for example print jobs including print data and printing instructions and error jobs where an error has occurred. Furthermore, it also includes jobs for processing in the system having various statuses, such as in-execution jobs, which are undergoing execution of print processing or the like, standby jobs for which a print request has been made and is standing by for commencement of processing, and a completed job for which output processing has been finished.

A system 110 is a system constituted by an offset printing workflow and includes a plate-making device, an offset printing apparatus, and various post-processing apparatuses. A plate-making device 111 is a CTP (computer to plate) device that outputs plates from print jobs. An offset printing apparatus 112 uses the plates to output printed materials. A folding device 113 is one post-processing apparatus that performs a folding process on loaded printed materials in accordance with predetermined instructions. A collating device 114 is one post-processing apparatus that arranges loaded printed materials into a page order of a single manuscript in accordance with predetermined instructions. A binding device 115 is one post-processing apparatus that performs a binding process on loaded printed materials in accordance with predetermined instructions. A trimming device 116 is one post-processing apparatus that performs a trimming process on loaded printed materials in accordance with predetermined instructions.

A system 120 is a system constituted by a digital printing workflow and includes an MFP and various post-processing apparatuses. An MFP 121 is a computer device (information processing device) having components such as a CPU, a ROM, a RAM, and an HD for example, and its various functions are achieved by the CPU executing programs stored on the ROM, HD, or other storage media. A trimming device 122 is one post-processing apparatus that performs a trimming process on loaded printed materials in accordance with predetermined instructions.

Figure 14:
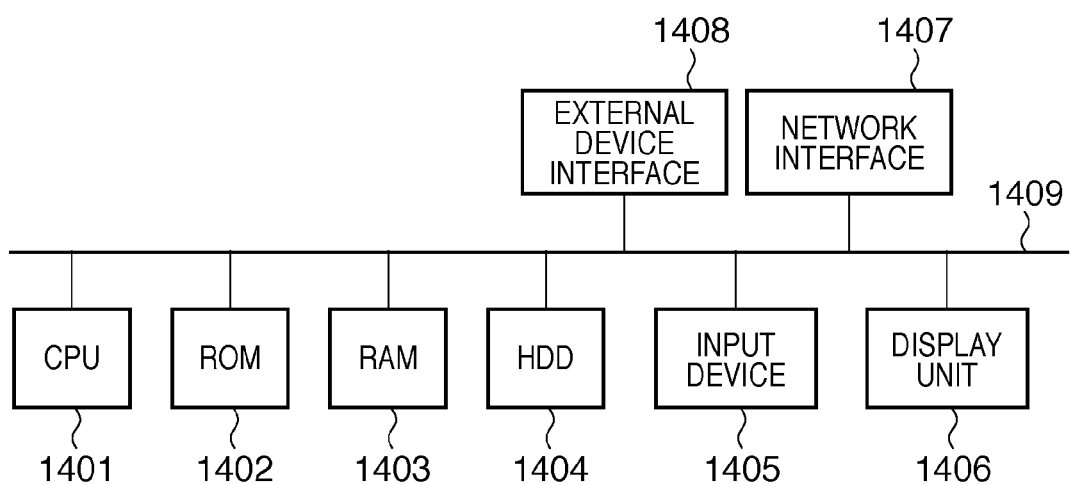
FIG. 14 is a diagram showing a hardware configuration of an information processing device to which a print job control apparatus according to the present embodiment is applied.

A print job control apparatus 130 is a computer device (information processing device) having a job control function. An ordinary information processing device as shown in FIG. 14 can be applied to the configuration of the print job control apparatus 130. As shown in FIG. 14, the print job control apparatus 130 includes a CPU 1401, a ROM 1402, a RAM 1403, and an HDD 1404. Also included are an input device 1405 such as a keyboard, a display unit 1406 such as a display, an external device interface 1408 for connecting to external storage devices and the like, and a network interface 1407 for connecting to a network such as a LAN. Furthermore, these are mutually connected using a system bus 1409 and can carry out sending and receiving of data. In a configuration such as that shown in FIG. 14, the various functions are achieved by the CPU 1401 executing programs stored on the ROM 1402, the HDD 1404, or other storage media. It should be noted that each step in the flowcharts described in the present embodiment is executed by the CPU 1401.

A job transceiving unit 131 carries out transceiving of all jobs exchanged between the MIS and the print job control apparatus 130. It should be noted that in the present embodiment, a job includes, for example, print jobs including print data and printing instructions and error jobs where an error has occurred. Furthermore, it also includes jobs for processing in the system having various statuses, such as in-execution jobs, in which processing such as print processing is being executed, standby jobs for which a print request has been made and is standing by for commencement of processing, and a completed job for which output processing has been finished.

An imposition instruction conversion unit 132 converts imposition instruction portions in the job tickets of print jobs to imposition instructions corresponding to papers that can be processed by the MFP. A finishing process analysis unit 133 references the job tickets of print jobs for post-processing apparatuses to determine whether or not the processes for the post-processing apparatuses can be substituted by simple finishing processes of the internal finishing process functions (also referred to as internal post-processing functions) of the digital printing apparatus. An MFP internal functions obtaining unit 134 obtains configuration information and capability information of the MFP internal functions from the MFP. Based on a result of the finishing process analysis unit 133, a job ticket conversion instruction generating unit 135 generates an instruction list in which instructions relating to the conversion and sending of job tickets of print jobs are listed. In accordance with the job ticket conversion instruction list, a job ticket conversion unit 136 generates job tickets in which finishing processes are merged and corrected for the internal finishing process functions for the MFP of the digital printing workflow. In accordance with the job ticket conversion instruction list, a job ticket modifying unit 137 for post-processing apparatuses modifies the job tickets for the post-processing apparatuses respectively in regard to print jobs for the post-processing apparatuses. A job transceiving unit 138 carries out transceiving of all jobs exchanged between the print job control apparatus 130 and the MFP of the digital printing workflow or the post-processing apparatuses.

Figure 2:
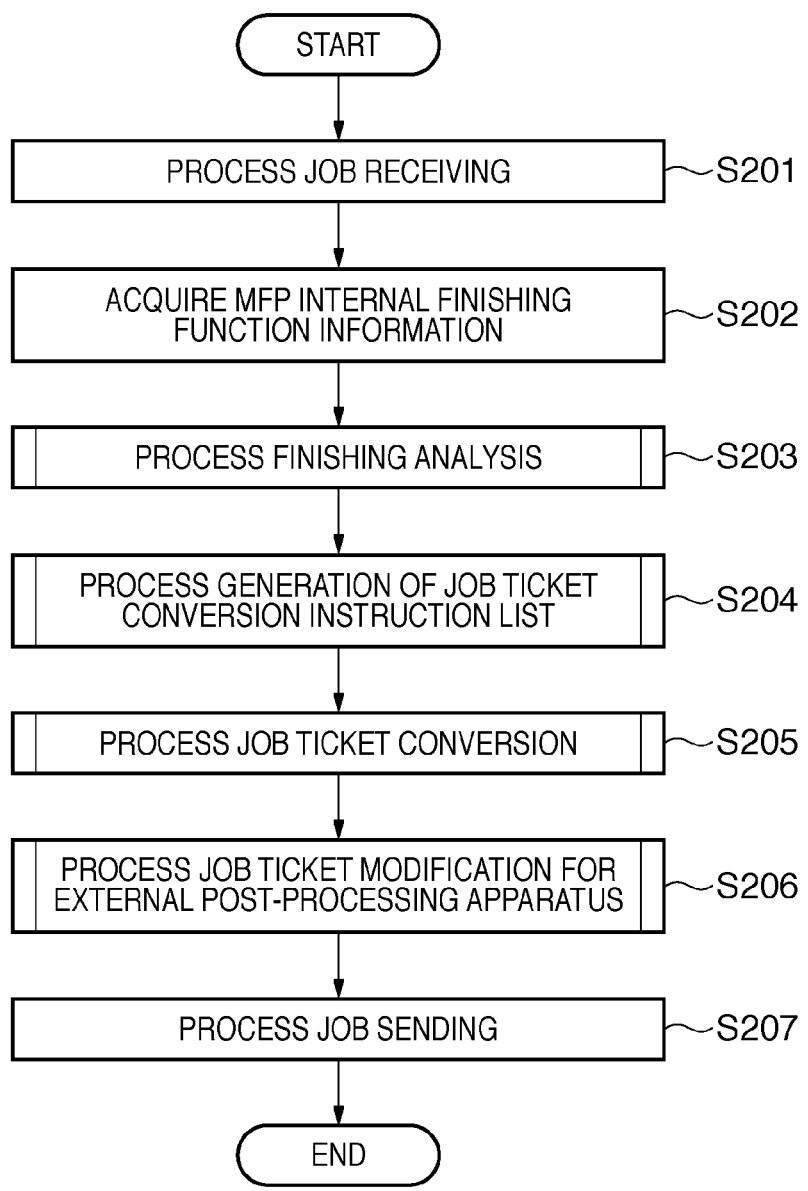
FIG. 2 is a flowchart showing a procedure of a process of receiving a print job that had been used in the offset printing workflow and sending a job ticket to an MFP and an external post-processing apparatus.

FIG. 2 is a flowchart showing a procedure of a process in which the print job control apparatus according to the present embodiment receives a print job that had been used in the offset printing workflow and sends the job ticket to the MFP of the digital printing workflow and external post-processing apparatuses. Here, in the present embodiment, description is given regarding a case where the same print job is processed in the digital printing workflow such that the print job that had been used in the offset printing workflow does not undergo plate-making again.

First, at step S201, the job transceiving unit 131 receives a print job that has been used in an offset printing workflow.

Next, at step S202, the MFP internal functions acquiring unit 134 (one example of an acquiring unit) acquires configuration information and function information from the MFP and furthermore acquires therefrom internal finishing process function information (also referred to as MFP internal post-processing function information). Here, the print job control apparatus 130 stores the configuration information and that function information of the MFP and the internal finishing process function information including information of the accuracy of finishing processes in the RAM or HD. At step S203, the finishing process analysis unit 133 determines whether or not the finishing processes of the same print job in the offset printing workflow can be substituted by simple finishing with the MFP internal post-processing functions.

Figure 3:
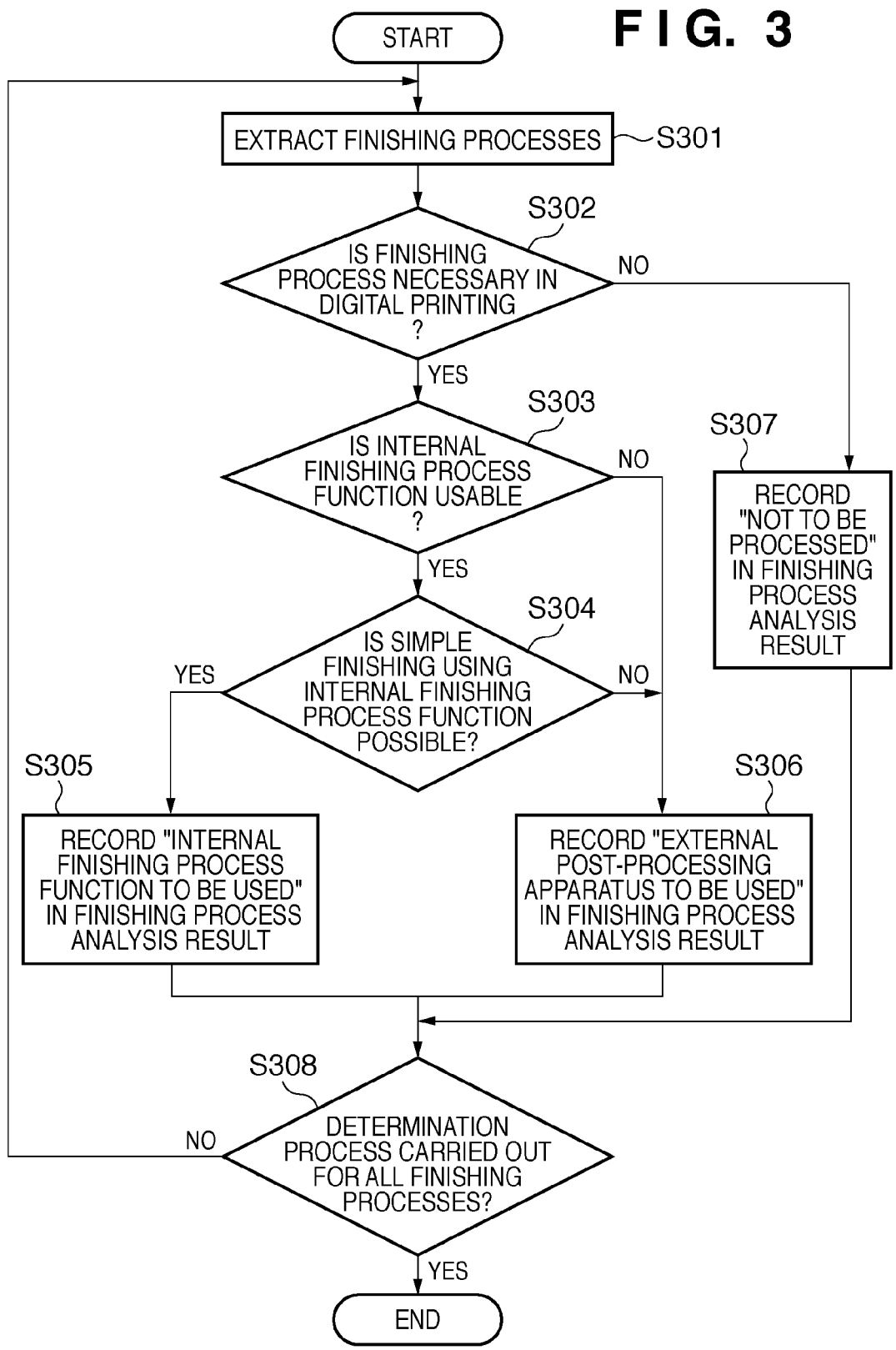
FIG. 3 is a flowchart showing a procedure of a determination process of a finishing process at step S203.

FIG. 3 is a flowchart showing a procedure of a determination process (one example of a determination unit) of a finishing process shown at step S203. First, at step S301, the print job control apparatus 130 performs extraction regarding finishing processes from job tickets for the post-processing apparatuses used in the offset printing workflow.

Here, FIGS. 12A to 12E are diagrams showing single examples of job tickets for the post-processing apparatuses used in the offset printing workflow. In the offset printing workflow, for example, a job ticket (FIG. 12D) of a "collating" process is sent to the collating device and a job ticket (FIG. 12E) of a "trimming" process is sent to the trimming device. It should be noted that the respective job tickets are independent.

At step S301, the print job control apparatus 130 performs extraction regarding information relating to finishing processes (a "folding" process shown in FIG. 12C, a "collating" process shown in FIG. 12D, and a "trimming" process shown in FIG. 12E) from job tickets for the post-processing apparatuses used in the offset printing workflow.

At step S302, the print job control apparatus 130 determines whether or not the extracted finishing processes are necessary in the digital printing workflow. For example, in the case where the same finishing size as a standard size usable in the MFP is instructed, the trimming process is determined as unnecessary. Here, when trimming has been determined unnecessary (NO at step S302), the procedure proceeds to step S307 and the print job control apparatus 130 records "not to be processed" as a finishing process analysis result and stores this in a memory or the like.

Here, FIG. 5 is a diagram showing one example of a finishing process analysis result according to the present embodiment. As shown in FIG. 5, the finishing process analysis result indicates the type of finishing process and a result of the analysis (determination). For example, in FIG. 5, a "folding" process, a "trimming" process, and a "collating" process are shown as finishing processes, and it is shown that the MFP internal finishing process functions are to be used for the "folding" process and the "collating" process. Furthermore, it is shown that in the digital printing workflow, the "trimming" process is not performed.

The procedure returns again to step S302. When it is determined necessary at step S302 (YES at step S302), the procedure proceeds to step S303 and the print job control apparatus 130 determines whether or not the MFP internal finishing process functions are usable. That is, the configuration information and capability information of the MFP, which have been acquired in advance, are referenced, and it is determined whether or not the function corresponding to the targeted finishing process is present in the MFP. For example, in the case where there is a folding process instruction in the offset printing workflow, it is determined "usable" if there is a "folding" process function in the MFP of the digital printing workflow. Also for example, in the case where there is a collating process instruction in the offset printing workflow, it is judged "usable" since the MFP is capable of digitally arranging the images in page order. In the case where it is determined at step S303 that there is no usable internal finishing process function for the targeted finishing process (NO at step S303), the print job control apparatus 130 records "use external post-processing apparatus" in the finishing process analysis result (FIG. 5) and stores this in a memory or the like (S306). On the other hand, when it is determined that there is a usable internal finishing process function in regard to the finishing processes of the MFP (YES at step S303), then the procedure proceeds to step S304 and the print job control apparatus 130 determines whether or not simple finishing is possible using the MFP internal post-processing functions. For example, in the case where the MFP can substitute for the post-processing of the offset printing workflow, such as the case where a desired printed material is obtainable using trimming at specific positions and a range that can be processed by the MFP, the print job control apparatus 130 determines that simple finishing is possible. Other cases of this include a case where a desired printed material is obtainable by a trimming process within a specific thickness (or sheet number) that can be processed by the MFP, or a case where a desired printed material is obtainable by a binding process within a specific thickness (or sheet number) that can be processed by the MFP. Conversely, in the case where processing is necessary outside the range of the capability information compared to the capability information of the MFP such as a case where a trimming process is requested at other than standard positions such as in gang-up printing, or in the case where a binding process is requested of a specific thickness (or sheet number) or greater, then it is determined that simple finishing is not possible. It should be noted that the desired printed materials in the aforementioned examples are printed materials obtained by executing the offset printing workflow.

When it has been determined at step S304 that "simple processing is not possible" (NO at step S304), the procedure proceeds to step S306, and the print job control apparatus 130 records "use external post-processing apparatus" as a finishing process analysis result as shown in FIG. 5 and stores this in a memory or the like. On the other hand, when it has been determined that "simple processing is possible" (YES at step S304), the procedure proceeds to step S305, and the print job control apparatus 130 records "use internal finishing process functions" as a finishing process analysis result as shown in FIG. 5 and stores this in a memory or the like. At step S308, the print job control apparatus 130 determines whether or not determinations have been made for all finishing processes and if there are undetermined finishing processes (NO at step S308), the procedure returns to step S301. And if the determinations have been made for all the finishing processes (YES at step S308), the procedure proceeds to step S204 in FIG. 2.

At step S204 shown in FIG. 2, the print job control apparatus 130 (one example of a list generating unit) causes the job ticket conversion and instruction generating unit 135 to generate a job ticket conversion instruction list in which are listed the instructions regarding the conversion and sending of the job tickets of each print job.

Figure 4:
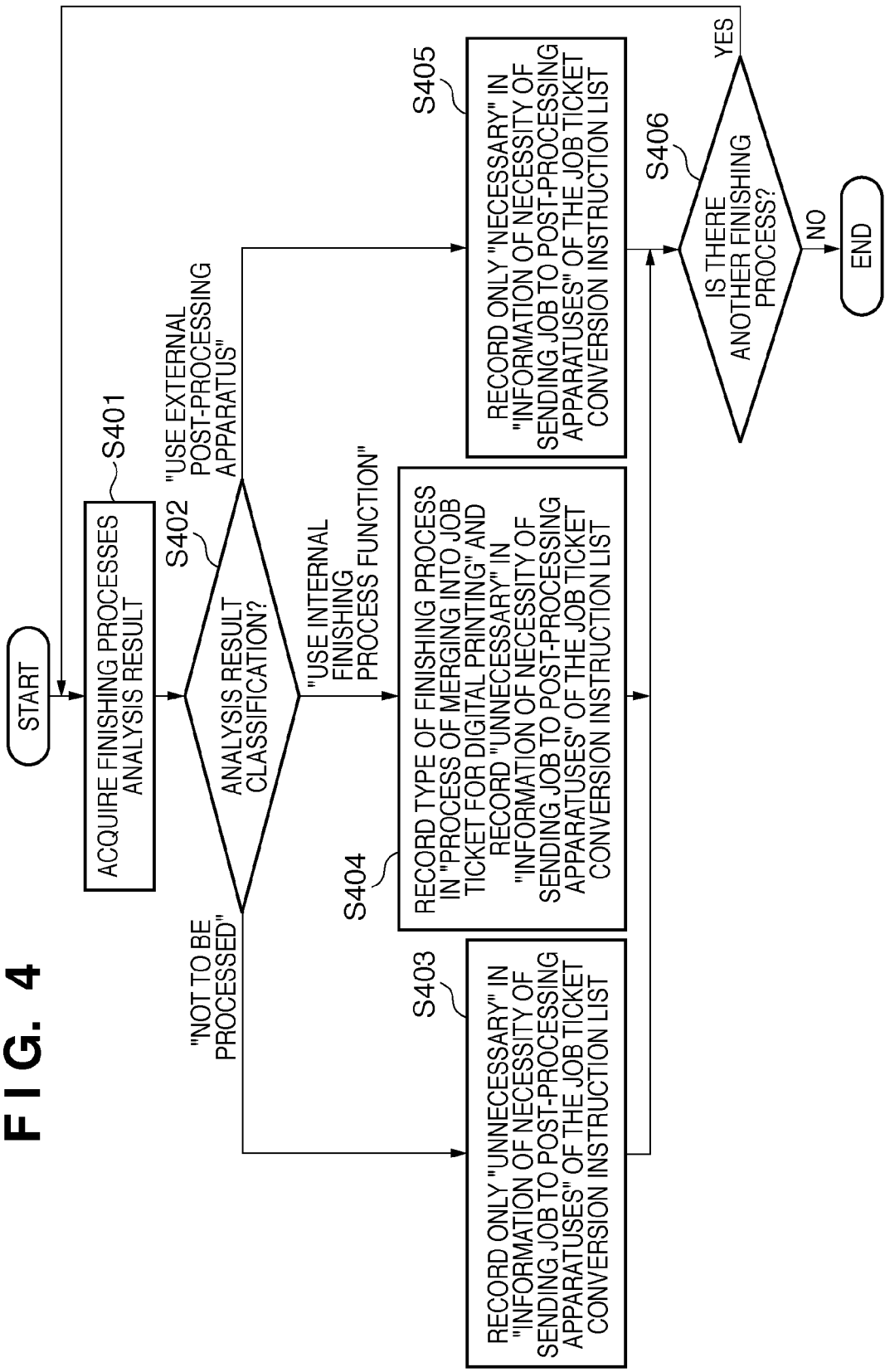
FIG. 4 is a flowchart showing a procedure of a process of generating a job ticket conversion instruction list at step S204.

FIG. 4 is a flowchart showing a procedure of a process of generating a job ticket conversion instruction list at step S204. First, at step S401, the job ticket conversion and instruction generating unit 135 acquires a result determined by the finishing process analysis unit 133. Next, at step S402, the job ticket conversion and instruction generating unit 135 classifies the determination results of the finishing process analysis unit 133. Here, for finishing processes recorded as "not to be processed", the job ticket conversion and instruction generating unit 135 records "unnecessary" at step S403 in "information of necessity of sending job to post-processing apparatuses" of the job ticket conversion instruction list. In this case, the job ticket conversion and instruction generating unit 135 does not record a finishing process classification in "process of merging into job ticket for digital printing".

Here, FIG. 6 is a diagram showing one example of a job ticket conversion instruction list according to the present embodiment. As shown in FIG. 6, the job ticket conversion instruction list shows relevant finishing processes in a section "process of merging into job ticket for digital printing". Furthermore, the classification of the relevant post-processing apparatus and the necessity of sending the job to that apparatus are shown in a section "information of necessity of sending job to post-processing apparatus". For example, the internal processing function of the MFP is to be used for the "folding" process, and therefore this is shown as "process of merging into job ticket for digital printing" in FIG. 6. Furthermore, since a post-processing apparatus is not used in the digital printing workflow system, sending of the job is set to "unnecessary".

At step S404, the type of finishing process for finishing processes recorded as "internal finishing process function to be used" is recorded in "process of merging into job ticket for digital printing" of the job ticket conversion instruction list (FIG. 6). In this case, the job tickets for digital printing are merged, and therefore "unnecessary" is recorded in "information of necessity of sending job to post-processing apparatus".

Furthermore, for finishing processes recorded as "external post-processing apparatus to be used", "necessary" is recorded at step S405 in "information of necessity of sending job to post-processing apparatuses" of the job ticket conversion instruction list (FIG. 6). In this case, a finishing process classification is not recorded in "process of merging into job ticket for digital printing".

At step S406, if the classifications and the recording to job ticket conversion instruction list are not finished for all the determination results (YES at step S406), then the procedure returns to step S401. On the other hand, if the classifications and the recording to job ticket conversion instruction list are finished for all the determination results (NO at step S406), then the procedure proceeds to step S205 shown in FIG. 2.

At step S205 shown in FIG. 2, the job ticket conversion unit 136 (one example of a first generating unit) generates job tickets in accordance with the job ticket conversion instruction list in which finishing processes are merged and corrected for the internal finishing process functions for the MFP of the digital printing workflow.

Figure 11:
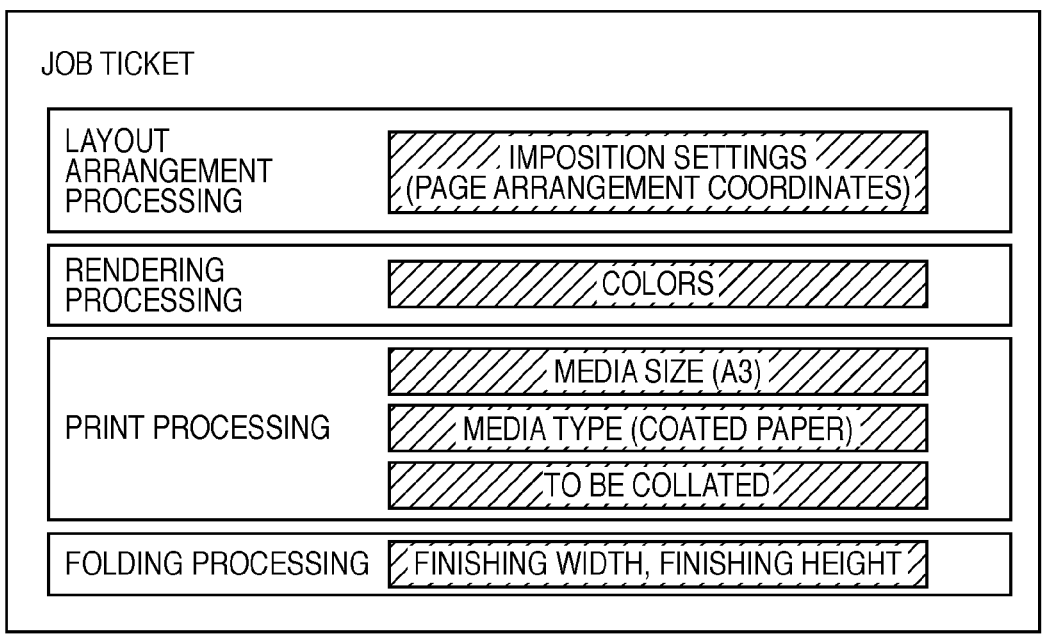
FIG. 11 is a diagram showing one example of a job ticket that has been merged and corrected for internal finishing process functions of an MFP.
Figure 12A:
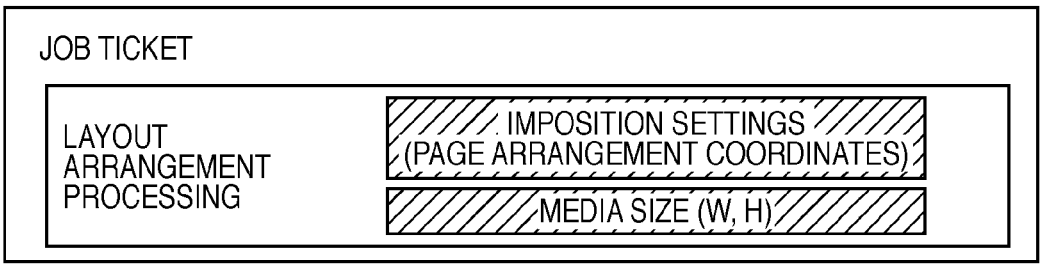
FIGS. 12A to 12E are diagrams showing single examples of job tickets for the post-processing apparatuses used in the offset printing workflow.
Figure 12B:
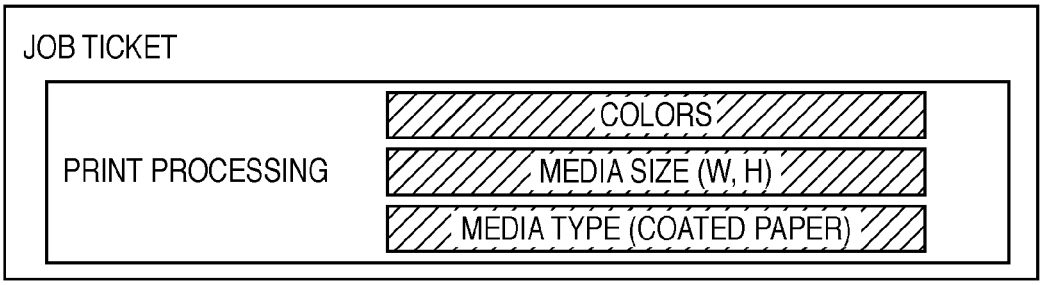
Figure 12C:
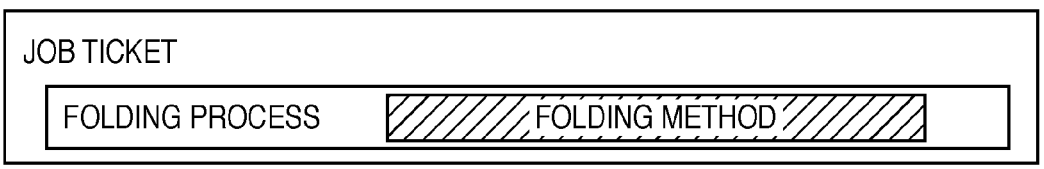
Figure 12D:
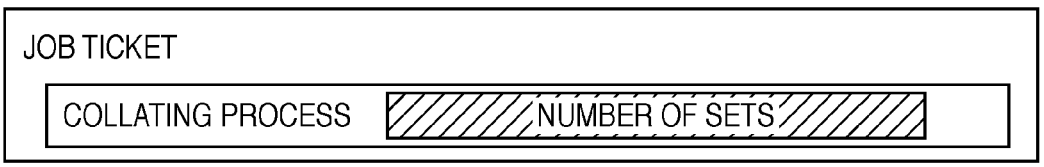
Figure 12E:
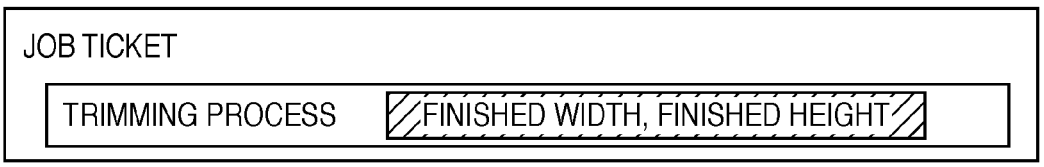

Here, FIG. 11 is a diagram showing one example of a job ticket in which finishing processes have been merged and corrected for the internal finishing process functions of the MFP of the digital printing workflow. As shown in FIG. 11, job tickets for "layout arrangement processing", "rendering processing", "print processing", and "folding processing", which are respectively independent in an offset printing workflow, are merged as a job ticket to be sent to the MFP.

Figure 7:
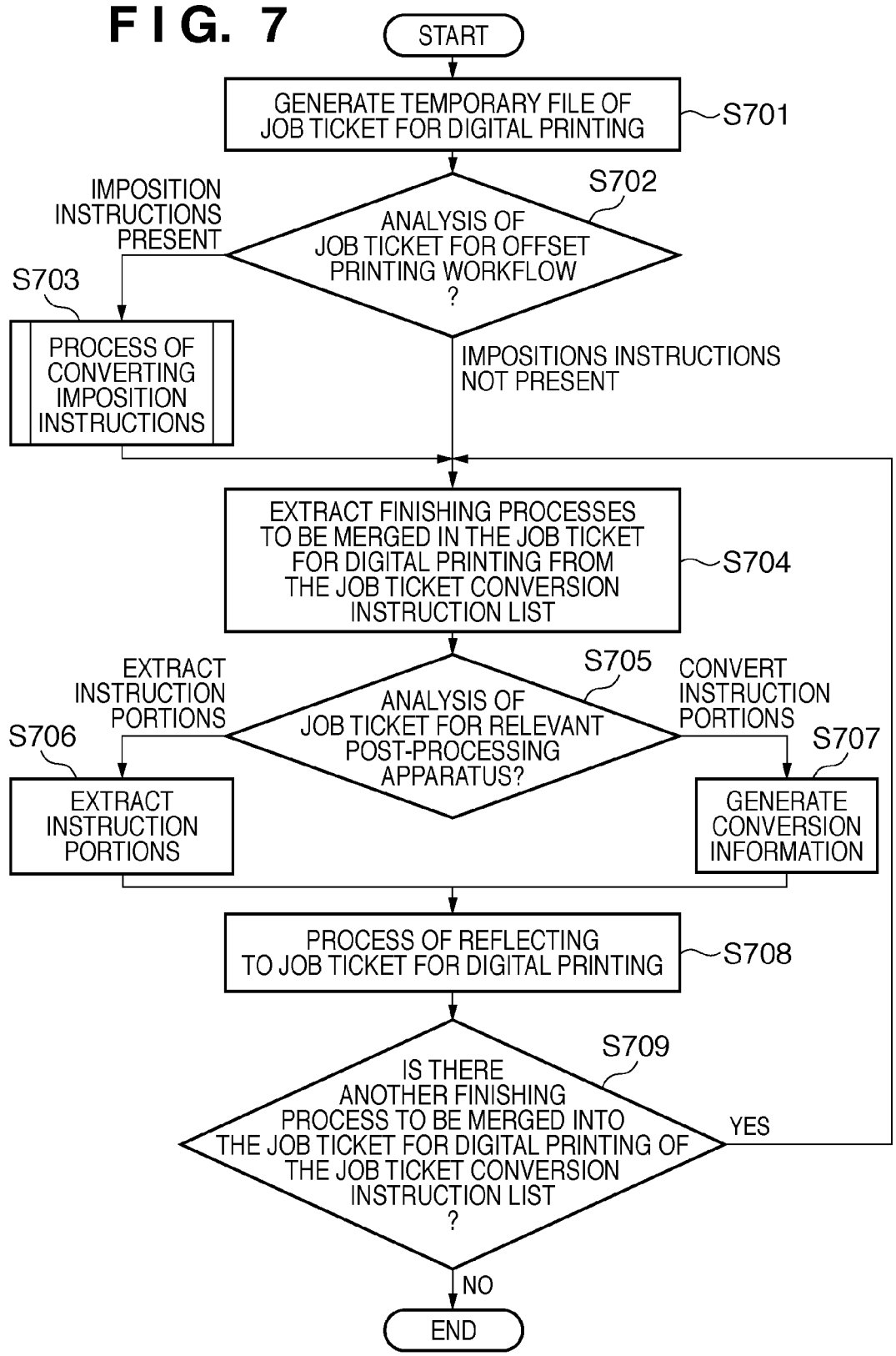
FIG. 7 is a flowchart showing a procedure of a job ticket conversion process at step S205.

FIG. 7 is a flowchart showing a procedure of a job ticket conversion process at step S205. First, in generating printing instructions to be sent to the MFP, at step S701, the job ticket conversion unit 136 generates a temporary file of a job ticket for digital printing in which no content of instructions is contained. Next, at step S702, the job ticket conversion unit 136 references the job tickets belonging to the print job for the offset printing workflow received at step S201, and determines whether or not there are any imposition instructions. Here, at step S703, when there are imposition instructions, the job ticket conversion unit 136 converts portions of the imposition instructions of the job ticket of the print job to imposition instructions corresponding to the paper that can be processed by the MFP. On the other hand, if there are no imposition instructions, the procedure proceeds to step S704.

Figure 8:
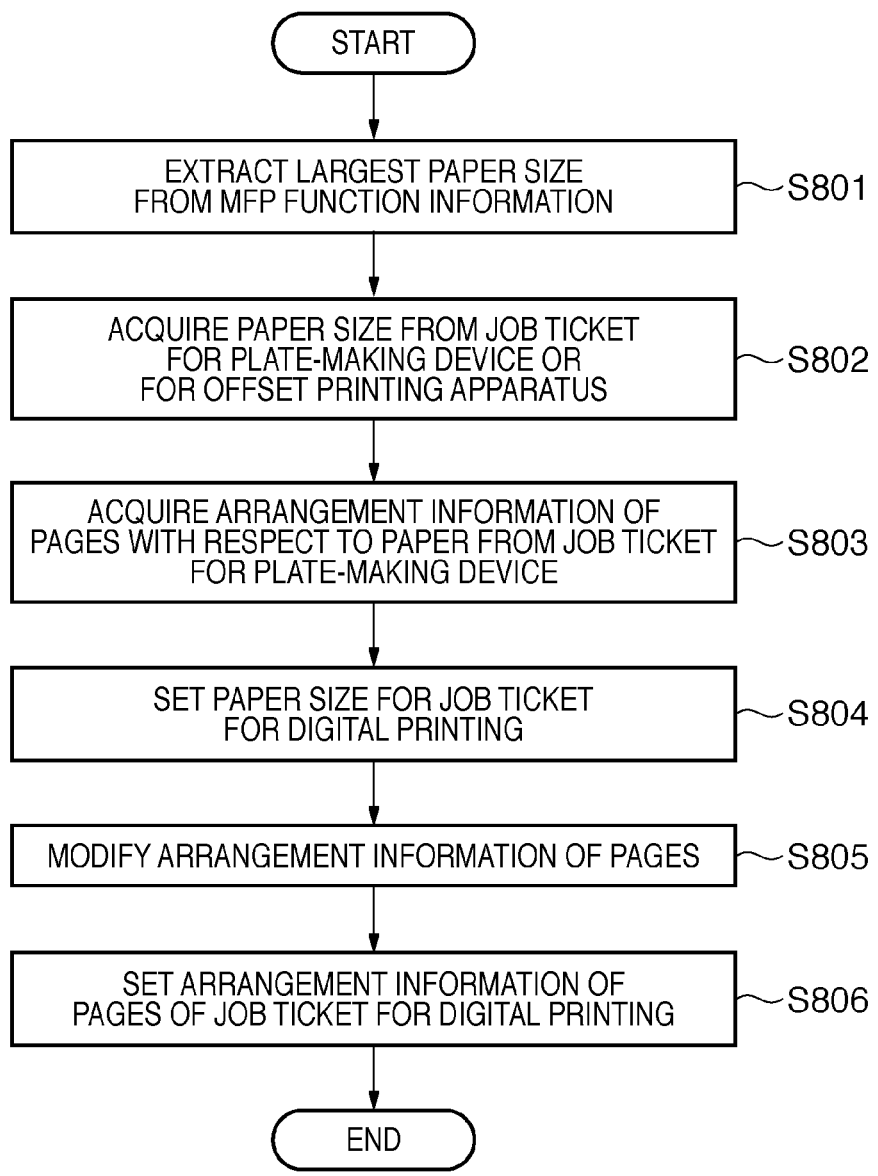
FIG. 8 is a flowchart showing a procedure of a process of converting imposition instructions.

Here, description is given regarding a process of converting imposition instructions. FIG. 8 is a flowchart showing a procedure of a process of converting imposition instructions. First, at step S801, the imposition instruction conversion unit 132 extracts the largest paper size from function information of the MFP. Next, at step S802, the imposition instruction conversion unit 132 acquires the paper size from the job ticket for the plate-making device or for the offset printing apparatus. At step S803, the imposition instruction conversion unit 132 acquires arrangement information of the page data for the paper from the job ticket for the plate-making device. It should be noted that the page data is data indicating the content of one page portion to be printed onto the paper. Here, one page portion refers to a logical single page. Accordingly, in the case where data of two page portions is arranged on the surface of the paper, two sets of page data are used. Next, at step S804, the imposition instruction conversion unit 132 sets the paper size of the job ticket for digital printing to the largest paper size of the MFP. At step S805, the imposition instruction conversion unit 132 modifies the arrangement information of the page data to match the paper size of the MFP, and at step S806 sets this as the arrangement information of the page of the job ticket for digital printing. For example, in a print job for a press plate printing system, arrangement information indicates that A1 size paper is to be used and that data of eight page portions of A4 size page is to be arranged on the surface of the A1 size paper. Here, in the case where a print job for the press plate printing system is to be applied to the digital printing system whose largest paper size is A3, the arrangement information is altered so that the page data of the first and second pages is arranged on a surface of a first sheet of paper. Further still, the arrangement information is altered so that the page data of the third and fourth pages is arranged on a surface of a second sheet of paper, and the page data of the fifth and sixth pages is arranged on a surface of a third sheet of paper. In this way, a print job for the digital printing system is generated based on the altered arrangement information. As described above, the imposition instructions are converted and the procedure proceeds to step S704 shown in FIG. 7.

Again, reference is made to FIG. 7. At step S704, the job ticket conversion unit 136 extracts finishing processes to be merged in the job ticket for digital printing from the job ticket conversion instruction list generated at step S204. At step S705, the job ticket conversion unit 136 references the job ticket for the post-processing apparatus relevant to the extracted finishing process and determines whether to carry out extraction of portions of the instruction information or to carry out conversion of the instructions. For example, in the case of instructions for a "folding" process, the instructions are equivalent in the MFP also, and therefore "extract instruction portions" is determined. In the case where "extract instruction portions" is determined, the job ticket conversion unit 136 extracts at step S706 the portions of the instruction information from the job ticket for the "folding" apparatus, which is the relevant post-processing apparatus.

Furthermore, in the case of a "collating" process, the images are digitally arranged in the MFP in page order so as to correspond to collation, and therefore the job ticket conversion unit 136 determines "convert instruction portions". In the case where "convert instruction portions" is determined, at step S707 the job ticket conversion unit 136 converts the instruction portions of the job ticket of the "collating" process to instruction portions (instruction information) for arrangement to be performed in a page order that is characteristic to the MFP.

At step S708, the job ticket conversion unit 136 reflects the instruction portions extracted at step S706 and the instruction information replaced at step S707 into the job ticket for digital printing. At step S709, if there is a finishing process that has not been merged into the job ticket for digital printing (YES at step S709), the job ticket conversion unit 136 returns to step S704, but if all the finishing processes are merged (NO at step S709), the procedure proceeds to step S206 shown in FIG. 2.

At step S206 shown in FIG. 2, the job ticket modifying unit 137 for post-processing apparatuses modifies the respective job tickets for the post-processing apparatuses in accordance with the job ticket conversion instruction list in regard to print jobs for the post-processing apparatuses (one example of a second generating unit).

Figure 9:
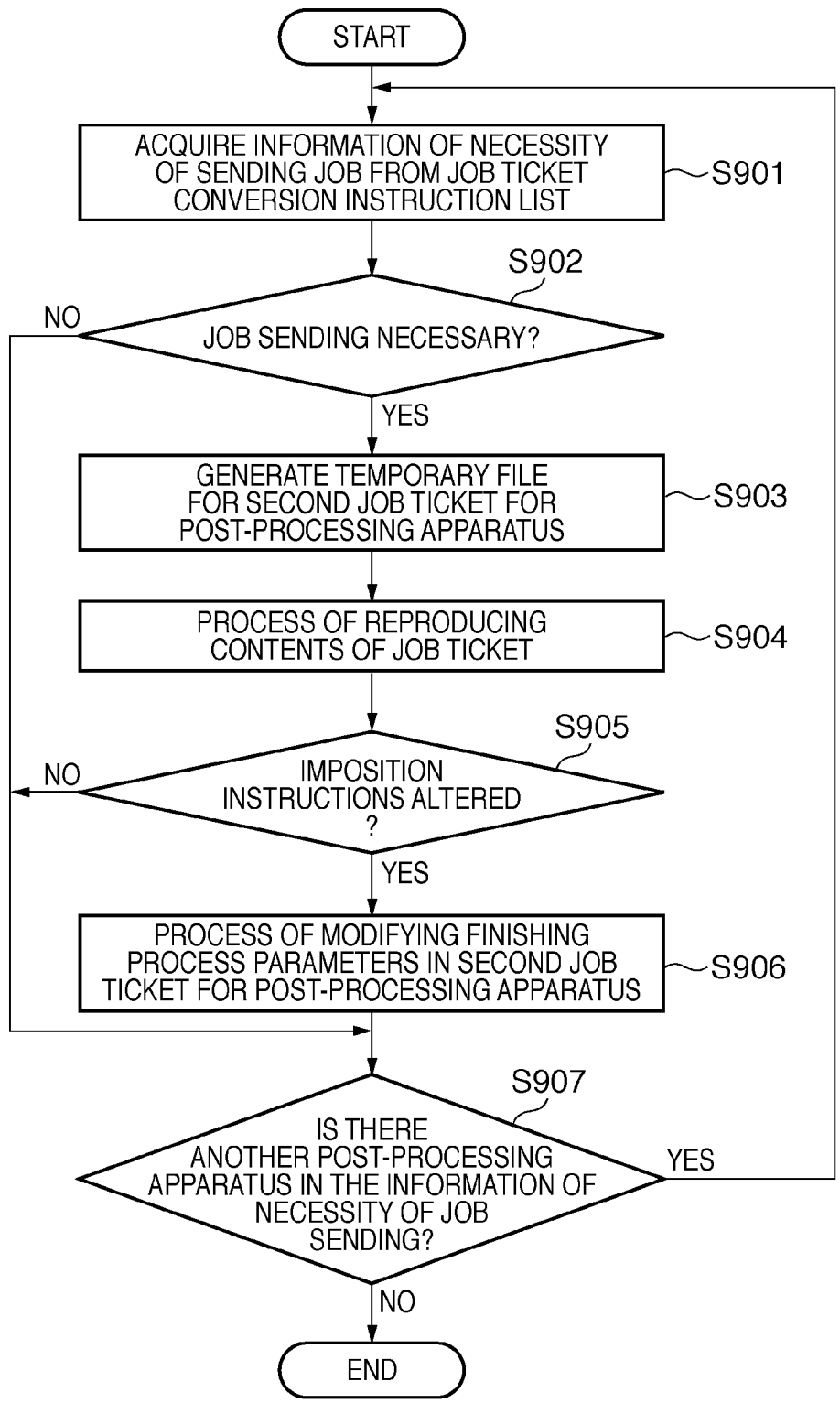
FIG. 9 is a flowchart showing a procedure of a process of modifying a job ticket for a post-processing apparatus at step S206.

FIG. 9 is a flowchart showing a procedure of a process of modifying a job ticket for a post-processing apparatus at step S206. First, at step S901, the job ticket modifying unit 137 for post-processing apparatuses acquires "information of necessity of sending job to post-processing apparatus" from the job ticket conversion instruction list. For example, in the case where "external post-processing apparatus to be used" is recorded as the finishing process analysis result at step S203 since there is no trimming function in the MFP, "necessary" is recorded in the "information of necessity of sending job to post-processing apparatus" of the job ticket conversion instruction list of step S204.

At step S902, the job ticket modifying unit 137 for post-processing apparatuses determines whether or not "necessary" is recorded in the "information of necessity of sending job to post-processing apparatus". Here, in the case where "necessary" is recorded (YES at step S902), the procedure proceeds to step S903 and the job ticket modifying unit 137 for post-processing apparatuses generates a temporary file for generating a second job ticket for the post-processing apparatus different from the job ticket for the MFP. On the other hand, in the case where "necessary" is not recorded (NO at step S902), the procedure proceeds to step S907.

At step S904, the job ticket modifying unit 137 for post-processing apparatuses reproduces the content of the job ticket of the targeted post-processing apparatus that had been used in the offset printing workflow into the second job ticket for the post-processing apparatus. Next, at step S905, the job ticket modifying unit 137 for post-processing apparatuses determines whether or not a process of converting imposition instructions of step S703 has been carried out. Here, in the case where the process of converting imposition instructions has been carried out (YES at step S905), the procedure proceeds to step S906 and the job ticket modifying unit 137 for post-processing apparatuses modifies the parameters in content reproduced in the second job ticket for the post-processing apparatus affected by conversion of the imposition instructions. For example, in the case of trimming, there is an influence on the information of positions for trimming, and the trimming positions before the conversion of the imposition instructions are converted to information of positions corresponding to coordinates after the conversion of the imposition instructions. On the other hand, if the process of converting imposition instructions has not been carried out (NO at step S905), the procedure proceeds to step S907.

At step S907, the job ticket modifying unit 137 for post-processing apparatuses returns to step S901 if there is information yet to be processed in the information of necessity of job sending in the job ticket conversion instruction list (YES at step S907). On the other hand, if all the processing is completed (NO at step S907), the procedure proceeds to step S207 shown in FIG. 2.

Figure 10:
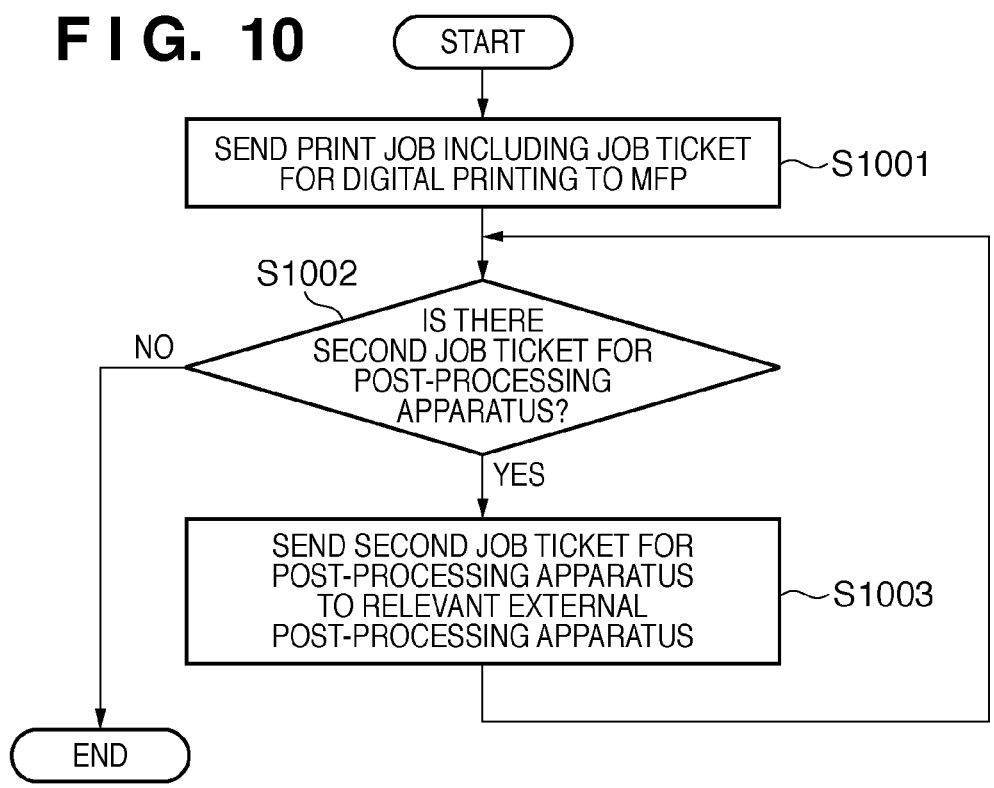
FIG. 10 is a flowchart showing a procedure of a process of sending a job at step S207.

In accordance with the job ticket conversion instruction list, the job transceiving unit 138 sends the print jobs for which conversion or modification was carried out at step S205 or step S206 to the MFP of the digital printing workflow or the necessary post-processing apparatus (one example of a sending unit, S207). FIG. 10 is a flowchart showing a procedure of a process of sending a job at step S207. First, at step S1001, the job transceiving unit 138 sends the previously generated job tickets for digital printing and content data for printing such as PDFs or images that have undergone RIP to the MFP as print jobs for the MFP. Next, at step S1002, a determination is performed as to whether or not a second job ticket for post-processing apparatuses has been generated. Here, in the case where the second job ticket has been generated (YES at step S1002), the job transceiving unit 138 proceeds to step S1003 and sends the second job ticket for post-processing apparatuses to the targeted external post-processing apparatus. Here, in the case where there is a yet to be processed second job ticket for post-processing apparatuses, the processing of steps S1002 and S1003 is repeated, and when all the processing is completed (NO at step S1002), the present process finishes.

As described above, an equivalent print job as a print job that was used in an offset printing workflow environment can be automatically used in a digital printing workflow environment without an operator having to reset the print job. Furthermore, the finishing processes available in the MFP are used effectively, and therefore operator-based task are made more efficient.

Figure 13:
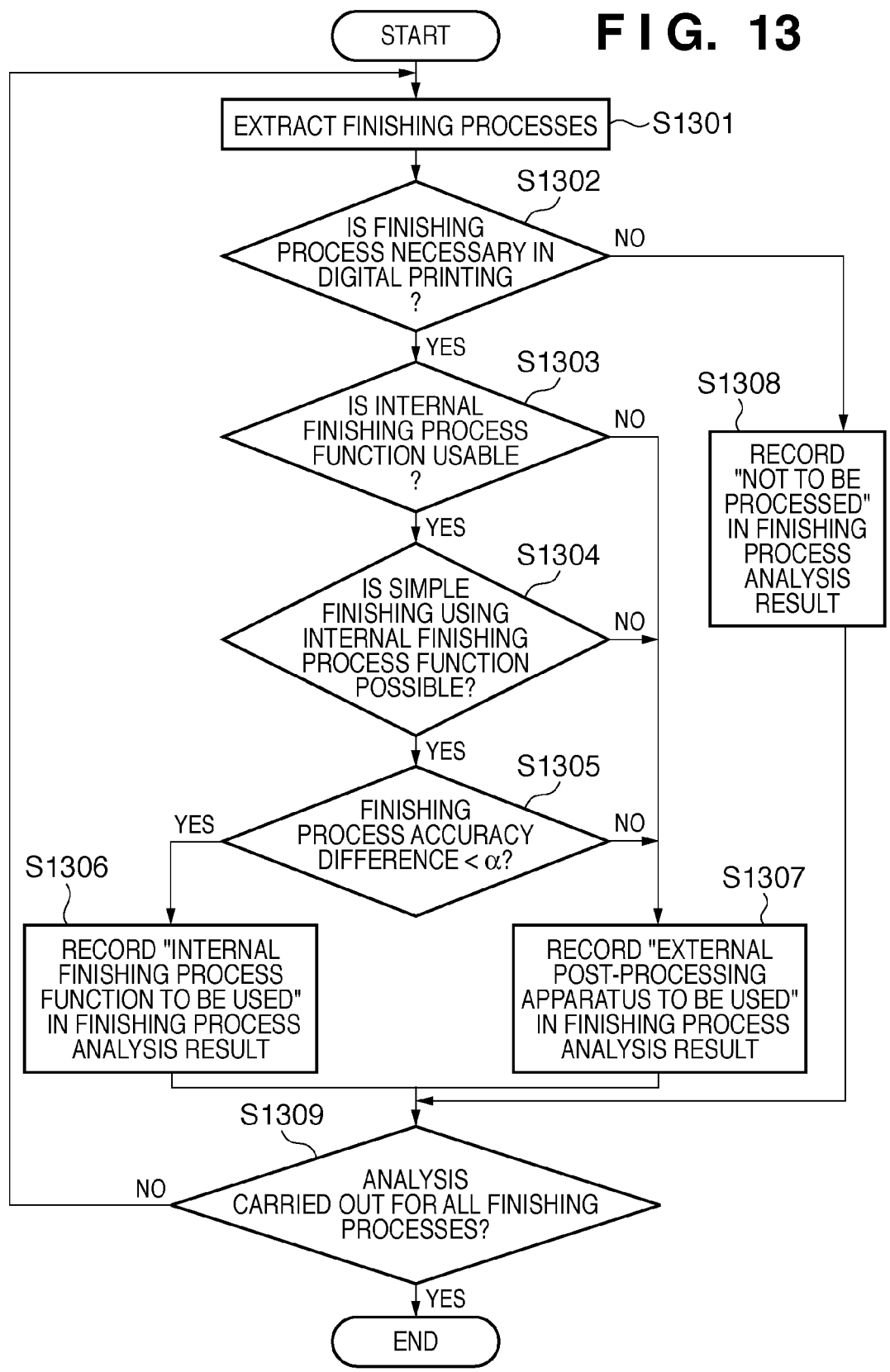
FIG. 13 is a flowchart showing a procedure of a finishing process analysis according to a second embodiment.

Even when the internal finishing process functions of the MFP and the effective functions of the external post-processing apparatus are the same, there may be differences in the accuracy of processing. FIG. 13 is a flowchart showing a procedure of a process of the finishing process analysis unit 133 determining a presence/absence of a process capable of undergoing simple finishing using an internal post-processing function regarding a finishing process of a print job equivalent to offset printing.

At step S1301, the finishing process analysis unit 133 performs extraction regarding finishing processes from job tickets for the post-processing apparatuses used in the offset printing workflow. Next, at step S1302, the finishing process analysis unit 133 determines whether or not the extracted finishing processes are finishing processes that are necessary in the digital printing. When "unnecessary" has been determined (NO at step S1302), the procedure proceeds to step S1308 and the finishing process analysis unit 133 records "not to be processed" as a finishing process analysis result as shown in FIG. 5 and stores this in a memory or the like. On the other hand, in the case where "necessary" is determined (YES at step S1302), the procedure proceeds to step S1303.

Next, at step S1303, the finishing process analysis unit 133 determines whether or not the internal finishing process functions of the MFP are usable. That is, a determination is performed as to whether or not the configuration information and capability information of the MFP, which have been acquired in advance, have functions corresponding to the targeted finishing process. For example, in the case where there is a "folding" process instruction, if there is a "folding" process function in the MFP, a determination is performed as to whether or not it is "usable". Furthermore, in the case where there is a "collating" process, since the MFP is capable of digitally arranging the images in page order, "usable" is determined.

In the case where it is determined that there is no usable internal finishing process function for the finishing process targeted (NO at step S1303), the finishing process analysis unit 133 records "use external post-processing apparatus" in the finishing process analysis result shown in FIG. 5 and stores this in a memory or the like (S1307). On the other hand, in the case where there is a usable internal finishing process function (YES at step S1303), the procedure proceeds to step S1304.

At step S1304, the finishing process analysis unit 133 determines whether or not simple finishing is possible using the internal finishing process functions of the MFP. It should be noted that a specific example is omitted here since this was given during the description of FIG. 3. When it has been determined at step S1304 that "simple processing is not possible" (NO at step S1304), the procedure proceeds to step S1307, and the finishing process analysis unit 133 records "use external post-processing apparatus" as the finishing process analysis result shown in FIG. 5, and stores this in a memory or the like. On the other hand, in the case where "simple finishing is possible" is determined (YES at step S1304), the procedure proceeds to step S1305.

From the internal finishing process function information extracted by the MFP internal functions obtaining unit 134, the finishing process analysis unit 133 obtains a difference between the information of processing accuracy relating to the finishing process to be acquired and the processing accuracy of the targeted post-processing apparatus. Then, the finishing process analysis unit 133 compares this difference against a predetermined threshold value $\alpha$ (S1305).

Here, the information of finishing process accuracy of the post-processing apparatuses is acquired by the MIS 101 from the various apparatuses in the offset workflow, and sent to the print job control apparatus 130 separately from the print job (one example of a receiving unit). Furthermore, the threshold value a is stored in a memory or the like in advance for each finishing process of the post-processing apparatuses.

At step S1305, the finishing process analysis unit 133 selects the threshold value a from the finishing process of the targeted post-processing apparatus and obtains the difference between the processing accuracy of the internal finishing process function and the finishing process accuracy of the targeted post-processing apparatus. If a value thereof is less than the threshold value (YES at step S1305), then the procedure proceeds to step S1306 and "use internal finishing process function" is recorded in the finishing process analysis result shown in FIG. 5 and stored in a memory or the like. On the other hand, when this is not less than the threshold value (NO at step S1305), the procedure proceeds to step S1307 and the finishing process analysis unit 133 records "use external post-processing apparatus" in the finishing process analysis result shown in FIG. 5 and stores this in a memory or the like. For example, suppose that the accuracy of the trimming function of the internal finishing process function of the MFP is 0.5 mm, the accuracy of the trimming device of the targeted post-processing apparatus is 0.1 mm, and the threshold value a is 0.3 mm. In this case, since the difference of trimming accuracy is 0.4 mm, the procedure proceeds to step S1307 as a result of the determination at step S1305, and "use external post-processing apparatus" is recorded in the finishing process analysis result shown in FIG. 5.

Next, in the case where there are yet to be processed finishing processes when the finishing process analysis unit 133 determines at step S1309 whether or not determination processing has been finished for all the finishing processes (NO at step S1309), the procedure returns to step S1301. On the other hand, in the case where determination processing is finished for all the finishing processes (YES at step S1309), then the present processing is finished and the procedure proceeds to step S204 shown in FIG. 2. Processing from step S204 onward is equivalent to the description in the first embodiment.

As described above, with the present embodiment, the internal post-processing functions of the MFP of the digital printing workflow are used only in the case where they are within a certain specified processing accuracy range, and therefore the quality of the finish of the resultant product to be provided to the customer can be maintained uniformly.

Furthermore, the present invention includes a case of having an operating system (OS) or the like that runs on a computer carry out a part or all of the actual processing according to instructions of a program (print job control program) code such that the functionality of the foregoing embodiments is achieved by the processing thereof. Further still, the present invention can also be applied in a case where the program code read out from the computer-readable storage medium is written onto a memory provided in an extension card inserted into the computer or an extension unit connected to the computer. In this case, a CPU or the like provided in the extension card or extension unit may carry out a part or all of the actual processing according to instructions of the program code that has been written in such that the functionality of the foregoing embodiments is achieved by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-052583, filed Mar. 3, 2008, which is hereby incorporated by reference herein in its entirety.

What is claimed is:

1. A print job control apparatus that receives a print job, to be used in a press plate printing system, having post-processing and generates a print job capable of being used in a digital printing system including a digital printing apparatus and a post-processing apparatus, the print job control apparatus comprising:

an acquiring unit configured to acquire post-processing function information of the digital printing apparatus;

a determination unit configured to reference the post-processing function information acquired by the acquiring unit and the received print job, and determine to use either the post-processing function of the digital printing apparatus or the post-processing apparatus for the post-processing;

a first generating unit configured to generate a print job to be executed by the post-processing function of the digital printing apparatus in a case where the determination unit determines to use the post-processing function of the digital printing apparatus;

a second generating unit configured to generate a print job to be executed by the post-processing apparatus in a case where the determination unit determines to use the post-processing apparatus;

a sending unit configured to send the print job generated by the first generating unit to the digital printing apparatus or send the print job generated by the second generating unit to the post-processing apparatus; and a receiving unit configured to receive data indicating an accuracy of the post-processing apparatus, wherein the determination unit further obtains a difference between the accuracy of the post-processing apparatus indicated by the data received by the receiving unit and an accuracy of the post-processing function of the digital printing apparatus included in the post-processing function information acquired by the acquiring unit, and in a case where the difference is less than a predetermined threshold value, the determination unit determines that the post-processing function of the digital printing apparatus is to be used for the post-processing, and in a case where the difference is not less than the predetermined threshold value, the determination unit determines that the post-processing apparatus is to be used for the post-processing.

2. The print job control apparatus according to claim 1, wherein the determination unit further comprises a list generating unit configured to generate an instruction list, using a determination result, including a list of processes for which a post-processing function of the digital printing apparatus is to be used and information indicating whether or not a print job is to be sent to the post-processing apparatus.

3. The print job control apparatus according to claim 1, wherein the second generating unit generates a print job to be used in the post-processing apparatus by modifying a print job to be used in the press plate printing system.

4. A print job control method executed in a print job control apparatus that receives a print job, to be used in a press plate printing system, having post-processing and generates a print job capable of being used in a digital printing system including a digital printing apparatus and a post-processing apparatus, the print job control method comprising:

acquiring post-processing function information of the digital printing apparatus;

referencing the acquired post-processing function information and the received print job;

determining to use either the post-processing function of the digital printing apparatus or the post-processing apparatus for the post-processing;

generating a first print job to be executed by the post-processing function of the digital printing apparatus in a case where it is determined to use the post-processing function of the digital printing apparatus;

generating a second print job to be executed by the post-processing apparatus in a case where it is determined to use the post-processing apparatus;

sending the first print job to the digital printing apparatus or sending the second print job to the post-processing apparatus;

receiving data indicating an accuracy of the post-processing apparatus;

obtaining a difference between the accuracy of the post-processing apparatus indicated by the data received and an accuracy of the post-processing function of the digital printing apparatus included in the acquired post-processing function information;

in a case where the difference is less than a predetermined threshold value, determining that the post-processing function of the digital printing apparatus is to be used for the post-processing; and in a case where the difference is not less than the predetermined threshold value, determining that the post-processing apparatus is to be used for the post-processing.

5. A non-transitory computer-readable storage medium on which is stored a print job control program for receiving a print job, to be used in a press plate printing system, having post-processing and for generating a print job capable of being used in a digital printing system including a digital printing apparatus and a post-processing apparatus, the program causing a computer to:

acquire post-processing function information of the digital printing apparatus;

reference the acquired post-processing function information and the print job;

determine to use either a post-processing function of the digital printing apparatus or the post-processing apparatus for the post-processing;

generate a first print job to be executed by the post-processing function of the digital printing apparatus in a case where it is determined to use the post-processing function of the digital printing apparatus;

generate a second print job to be executed by the post-processing apparatus in a case where it is determined to use the post-processing apparatus;

send the first print job to the digital printing apparatus or send the second print job to the post-processing apparatus;

receive data indicating an accuracy of the post-processing apparatus;

obtain a difference between the accuracy of the post-processing apparatus indicated by the data received and an accuracy of the post-processing function of the digital printing apparatus included in the post-processing function information acquired;

in a case where the difference is less than a predetermined threshold value, determining that the post-processing function of the digital printing apparatus is to be used for the post-processing; and in a case where the difference is not less than the predetermined threshold value, determining that the post-processing apparatus is to be used for the post-processing.

* * * * *